(12) United States Patent
Di Sarno et al.

(10) Patent No.: US 12,344,068 B2
(45) Date of Patent: Jul. 1, 2025

(54) CONNECTION BRIDGE DEVICE

(71) Applicant: ZF FRIEDRICHSHAFEN AG, Friedrichshafen (DE)

(72) Inventors: Marco Di Sarno, Osnabruck (DE); Sören Knopp, Ostercappeln (DE); Eike Helm, Diepholz (DE); Paul Lenz, Waldkirchen (DE); Thomas Bergmann, Passau (DE); Karlheinz Hoher, Markdorf (DE); Thomas Waim, Grafenau (DE); Stefan Renner, Bodman-Ludwigshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/023,587

(22) PCT Filed: Jul. 19, 2021

(86) PCT No.: PCT/EP2021/070120
§ 371 (c)(1),
(2) Date: Feb. 27, 2023

(87) PCT Pub. No.: WO2022/042943
PCT Pub. Date: Mar. 3, 2022

(65) Prior Publication Data
US 2025/0100338 A1    Mar. 27, 2025

(30) Foreign Application Priority Data
Aug. 31, 2020 (DE) ..................... 10 2020 210 971.0

(51) Int. Cl.
*B60G 9/02* (2006.01)

(52) U.S. Cl.
CPC ...... *B60G 9/025* (2013.01); *B60G 2204/4302* (2013.01); *B60G 2206/16* (2013.01); *B60G 2206/8101* (2013.01)

(58) Field of Classification Search
CPC .......... B60G 9/02; B60G 9/022; B60G 9/025; B60G 2204/43; B60G 2204/4302; B60G 2206/16; B60G 2206/8101
USPC .................................................. 280/124.11
See application file for complete search history.

(56) References Cited

U.S. PATENT DOCUMENTS

| 6,129,367 A | 10/2000 | Bublies et al. |
| 2019/0135101 A1 | 5/2019 | Kucharski |

FOREIGN PATENT DOCUMENTS

| DE | 19962406 | 7/2001 | |
| EP | 1231083 | 8/2002 | |
| EP | 2995483 B1 * | 6/2019 | ............. B60G 21/05 |
| EP | 4335668 A1 * | 3/2024 | ............. B60G 7/008 |

(Continued)

*Primary Examiner* — Jason D Shanske
*Assistant Examiner* — Daniel M. Keck
(74) *Attorney, Agent, or Firm* — COZEN O'CONNOR (57) ABSTRACT

A connection bridge device is suggested for connecting a multipoint link to a vehicle axle, particularly a multipart vehicle axle. The connection bridge device comprises at least one base body for receiving and dissipating forces and/or torques transmitted between the vehicle axle and the multipoint link, at least one axle fastening unit for fastening the base body to the vehicle axle, and at least one link coupling unit for coupling the base body to the multipoint link, which link coupling unit is intersected by a main extension plane of the base body.

12 Claims, 6 Drawing Sheets

(56) References Cited

FOREIGN PATENT DOCUMENTS

| WO | WO 0206067 | 1/2002 | |
|----|------------|--------|---|
| WO | WO 2009125238 | 10/2009 | |
| WO | WO 2019154157 | 8/2019 | |
| WO | WO-2024052479 A1 * | 3/2024 | ............. B60G 7/008 |

* cited by examiner

CONNECTION BRIDGE DEVICE

CROSS REFERENCE TO RELATED APPLICATIONS

This is a U.S. national stage of Application No. PCT/EP2021/070120 filed Jul. 19, 2021. Priority is claimed on German Application No. DE 10 2020 210 971.0 filed Aug. 31, 2020 the content of which is incorporated herein by reference.

BACKGROUND OF THE INVENTION

1. Field of the Invention

The disclosure is directed to a connection bridge device for connecting a multipoint link to a vehicle axle, particularly a multipart vehicle axle. The disclosure is further directed to a connection system and to a vehicle, particularly a utility vehicle. In addition, the disclosure is also directed to a process for producing a connection bridge device.

2. Description of Related Art

Multipoint links and multipart vehicle axles are known from the prior art. For example, German Patent Application DE 199 62 406 A1 shows a four-point link and US Patent Application 2019/0135101 A1 shows an axle assembly with an electric motor.

SUMMARY OF THE INVENTION

A connection bridge device is suggested for connecting a multipoint link to a vehicle axle, particularly a multipart vehicle axle. The connection bridge device comprises at least one base body for receiving and dissipating forces and/or torques transmitted between the vehicle axle and the multipoint link. The connection bridge device comprises at least one axle fastening unit for fastening the base body to the vehicle axle. The connection bridge device comprises at least one link coupling unit for coupling the base body to the multipoint link, which link coupling unit is intersected by a main extension plane of the base body.

The connection bridge device is preferably at least partially formed as a connection bridge, particularly as an axle bracket. The multipoint link is formed in particular as a three-point link or as a four-point link. The four-point link is provided particularly for stabilizing a utility vehicle. Alternatively, it is also contemplated that the multipoint link is formed as an open wishbone. In particular, the open wishbone can have two arms arranged in a V-shape, particularly analogous to the three-point link, which have a virtual intersection. The open wishbone is formed particularly to be free from a central housing. The same vehicle axle can preferably be used with different chassis geometries, particularly different multipoint links, depending on a configuration of the connection bridge device. The vehicle axle is preferably formed as a motorized axle which comprises at least one drive unit. The vehicle axle has in particular at least two, preferably at least three, partial axle bodies, which are coupled with one another in particular. Alternatively, the vehicle axle can also have an individual partial axle body. A "main extension plane" of an object shall be understood particularly to mean a plane which is parallel to a largest side of a smallest notional rectangular cuboid that still fully encloses the object and, in particular, runs through the center point of the cuboid.

The multipoint link is preferably provided to connect the vehicle axle to a vehicle frame of a vehicle, particularly of a utility vehicle. In particular, the multipoint link is provided to route forces acting on the vehicle while driving, particularly forces acting on the vehicle axle, to the vehicle frame for axle guidance. The multipoint link, particularly the four-point link, is provided in particular to at least partially absorb torques, for example, due to roll motion, in order to stabilize the vehicle. The forces and/or torques can be transmitted particularly by the multipoint link at least partially from the vehicle axle to the vehicle frame. When the multipoint link is connected centrally directly to the vehicle axle, particularly to a central portion of the vehicle axle, the forces and/or torques can damage the vehicle axle, particularly the central portion of the vehicle axle. In particular, the central portion may be less robust, particularly softer, than other partial axle bodies of the vehicle axle, for example, because formed for receiving a drive unit.

The connection bridge device is preferably provided to connect the multipoint link indirectly to the vehicle axle. In particular, the connection bridge device serves as a connection piece between the multipoint link and the vehicle axle. The connection bridge device is preferably provided to connect the multipoint link to at least one partial axle body formed distinct from the central portion. The connection bridge device is preferably provided to connect the multipoint link to at least two partial axle bodies formed distinct from the central portion. The connection bridge device is preferably provided to at least partially receive forces and/or torques which are transmitted between the vehicle axle and the multipoint link and to at least partially direct them away from the central portion, particularly into the at least one partial axle body formed distinct from the central portion. By "provided" is meant in particular specifically programmed, specifically outfitted and/or specifically configured. Providing an object for a function shall be understood to mean particularly that the object carries out the function in at least one operating state.

The connection bridge device preferably comprises at least two axle fastening units for fastening the base body to the vehicle axle, particularly to the at least two partial axle bodies formed distinct from the central portion. The connection bridge device preferably comprises at least one link coupling unit for coupling the base body to the multipoint link formed as a three-point link. The base body is preferably formed as a metal component part, particularly as a cast component part. Alternatively, it is contemplated to form the base body as a composite component part, as a forged component part or other component part deemed useful by a person skilled in the art. In particular, the base body has a greater component stiffness than the central portion of the vehicle axle.

The axle fastening units and/or the at least one link coupling unit are/is preferably formed integral with the base body. By "integral" is meant particularly formed in one piece. This one piece is preferably produced from an individual blank, a mass and/or a casting. In particular, the connection bridge device is formed as an integral component part, particularly for realizing a high component stiffness. The axle fastening units and/or the at least one link coupling unit comprise/comprises in particular at least one fastening channel, preferably at least two or more fastening channels, for receiving fasteners, for example, a screw, a bolt, or the like. In particular, the fastening channels extend at least partially, preferably completely, through the base body, and are defined in particular by the base body. The at least one fastening channel of the link coupling unit provided for coupling with the three-point link preferably extends perpendicular to the at least one fastening channel of the link coupling unit provided for coupling with the four-point link.

The at least one link coupling unit is preferably arranged at least partially in the main extension plane of the base body, in particular for an efficient support of force and/or torque by the base body. The at least one link coupling unit preferably extends at least partially on two opposing sides of the main extension plane of the base body.

An efficient support of forces and/or torques and dissipation of forces and/or torques by a multipoint link is advantageously made possible by the inventive configuration of the connection bridge device. In an advantageous manner, a load relief of a vehicle axle, particularly a multipart vehicle axle, can be made possible and wear can be reduced. Use of a multipoint link together with a multipart, particularly motorized, vehicle axle can advantageously be made possible. A high level of safety for passengers of the vehicle can advantageously be made possible.

It is further suggested that the connection bridge device comprises at least two link coupling units for coupling the base body to at least two coupling units of the multipoint link. The connection bridge device preferably comprises at least two link coupling units for coupling the base body with the multipoint link formed as a four-point link or as an open wishbone. In particular, the coupling units of the multipoint link are formed as connection claws, particularly as molecular joints. The link coupling units for coupling with the four-point link or the open wishbone are preferably arranged in—particularly two—outer areas of the connection bridge device, particularly at least one link coupling unit for each outer area. The outer areas form opposing extreme points particularly along a main extension direction of the connection bridge device. A "main extension direction" of an object shall be understood particularly to mean a direction which extends parallel to a longest edge of a smallest notional rectangular cuboid that still fully encloses the object. The axle fastening units are preferably arranged in the outer areas, particularly at least one axle fastening unit to each outer area. A reliable coupling with a four-point link or an open wishbone can advantageously be made possible.

It is further suggested that the base body in a middle area remote of the at least one axle fastening unit extends perpendicular to the main extension plane farther than the at least one link coupling unit. The middle area is arranged in particular between the two outer areas along the main extension direction. In particular, the base body extends in the middle area on at least one side of the main extension plane, preferably on both sides of the main extension plane, perpendicular to the main extension plane farther than the at least one link coupling unit. A particularly robust connection bridge device can advantageously be provided.

It is further suggested that the base body has a maximum transverse extension perpendicular to the main extension plane in a middle area, particularly the above-mentioned middle area, remote of the at least one axle fastening unit. In particular, the base body has a larger transverse extension, particularly component thickness, in the middle area perpendicular to the main extension plane than in the outer areas. In particular, at least the base body of the connection bridge device provided for the connection of the four-point link has a maximum transverse extension perpendicular to the main extension plane in the middle area. The base body can preferably have at least one indentation, recess or the like in the middle area parallel to the main extension plane, particularly for a snug contact against the vehicle axle with power electronics, for example. An efficient support of force and/or torques by the base body can advantageously be made possible.

Further, it is suggested that the base body is formed at least partially as a hollow profile component part. The base body is preferably formed as a hollow profile component which is open on one or more sides. In particular, the base body of the connection bridge device provided for the connection of the four-point link is formed as a hollow profile component part which is open on one side. In particular, the base body of the connection bridge device provided for connecting the three-point link is formed as a hollow profile component which is open on multiple sides, particularly two sides. In particular, the base body of the connection bridge device provided for connecting the four-point link is formed at least partially open on a side intersected by the main extension plane. In particular, the base body of the connection bridge device provided for the connection of the four-point link is formed at least partially open on a side remote of the link coupling units. In particular, the base body of the connection bridge device provided for the connection of the three-point link is formed open on at least one side, preferably on two sides, which has or have no point of intersection with the main extension plane. The base body of the connection bridge device provided for the connection of the three-point link is preferably formed open on two sides which are arranged on different sides of the main extension plane. The base body is preferably formed open at least in the middle area. A connection bridge device which is optimized with respect to weight can advantageously be provided.

Further, it is suggested that the base body has at least one stiffening rib. In particular, at least the base body of the connection bridge device provided for the connection of the four-point link has the at least one stiffening rib. In particular, the base body has at least one stiffening rib, preferably at least two stiffening ribs, particularly preferably at least three stiffening ribs and most preferably at least four stiffening ribs. The stiffening ribs preferably have planes intersecting with the main extension plane. In particular, the stiffening ribs extend perpendicular to and parallel to the main extension plane. In particular, the stiffening ribs support spaced-apart outer lateral surface areas of the base body against one another transverse to the main extension plane. The base body with the stiffening ribs is formed in particular by a cast structure which is open on one side, particularly in the middle area. A connection bridge device that is optimized with respect to weight and stiffness can advantageously be provided.

Further, it is suggested that the base body has at least two stiffening ribs that together form an undercut. The two stiffening ribs preferably at least partially define a central void in the middle area. Considered in the main extension plane, the two stiffening ribs particularly form an angle of at least 45°, preferably an angle of at least 65°, particularly preferably an angle of at least 850 relative to one another. Considered in the main extension plane, the two stiffening ribs particularly form an angle of at most 125°, preferably at most 1050 and particularly preferably at most 85° relative to one another. Considered in the main extension plane, further stiffening ribs of the base body preferably extend parallel to one another. A connection bridge device with high bending stiffness can advantageously be provided.

Further suggested is a connection system comprising at least one vehicle axle, preferably the above-mentioned vehicle axle, particularly multipart vehicle axle, and at least one connection bridge device according to the invention for connecting a multipoint link to the vehicle axle, particularly multipart vehicle axle. The vehicle axle has at least one connection unit arranged separate from a central portion, particularly the above-mentioned central portion, of the vehicle axle for fastening the connection bridge device. The at least one connection unit is arranged in particular at the at least one partial axle body formed distinct from the central portion. The vehicle axle preferably comprises at least two connection units. In particular, at least one connection unit is arranged in each instance at at least one partial axle body formed distinct from the central portion. The partial axle bodies, particularly the connection units, which are formed distinct from the central portion are preferably arranged along the vehicle axle symmetrically around the central portion. The connection units are preferably provided for coupling with the axle fastening units of the connection bridge device. In particular, the connection units form screw locations for screwed fixing of the connection bridge device to the partial axle bodies formed distinct from the central portion. A reliable, low-wear fixing of the connection bridge device to the vehicle axle can advantageously be made possible.

Further, it is suggested that the vehicle axle is formed as a motorized axle and the central portion comprises at least one drive unit. In particular, the axle is provided for driving, particularly rotationally driving, wheels of the vehicle which are connected to the vehicle axle. The central portion at least partially forms a drive housing for receiving the at least one drive unit. The drive unit comprises in particular at least one electric motor, preferably at least two electric motors. Alternatively or additionally, it is conceivable that the drive unit comprises at least one hydraulic drive, at least one pneumatic drive, at least one internal combustion engine or other drive deemed useful by a person skilled in the art. The drive unit can comprise further components deemed useful by a person skilled in the art such as a differential, a transmission step, a gear unit or the like, for example. The central portion is arranged along the vehicle axle centrally between the at least two partial axle bodies formed distinct from the central portion and in particular is coupled with the partial axle bodies. The partial axle bodies formed distinct from the central portion in particular at least partially form a housing for torque transmission units. The partial axle bodies formed distinct from the central portion are preferably formed similar to one another. A motorized axle can advantageously be utilized with a multipoint link in a reliably operating manner and with low wear.

Further, it is suggested that the connection system comprises at least one multipoint link, particularly a three-point link or a four-point link. Alternatively, the multipoint link can also be formed as an open wishbone instead of as a three-point link or four-point link. The multipoint link is preferably connected to the vehicle frame of the vehicle in an articulated manner at two points. The multipoint link formed as three-point link is coupled in an articulated manner with the connection bridge device particularly at a further point. The multipoint link formed as four-point link is coupled in an articulated manner with the connection bridge device in particular at two further points. The multipoint link formed as a four-point link is coupled in an articulated manner with the connection bridge device in particular at two further points. An efficient and reliably operating connection system can advantageously be provided.

Further suggested is a vehicle, particularly the above-mentioned vehicle, particularly a utility vehicle, comprising at least one connection bridge device according to one aspect of the invention and/or at least one connection system according to one aspect of the invention. The vehicle is preferably formed as a land vehicle. The vehicle can be formed in particular as a truck, a construction site vehicle, a bus or as another vehicle deemed useful by a person skilled in the art. A vehicle which is safe for vehicle passengers can advantageously be provided.

Further suggested is a process for producing a connection bridge device according to one aspect of the invention. The connection bridge device is cast in at least one process step. In at least one further, particularly optional, process step, at least one casting core is destroyed. An efficient and economical process for producing the connection bridge device can advantageously be provided.

BRIEF DESCRIPTION OF THE DRAWINGS

The invention will be illustrated in the following figures referring to two embodiment examples. The drawings show.

DETAILED DESCRIPTION OF THE PRESENTLY PREFERRED EMBODIMENTS

Figure 1:
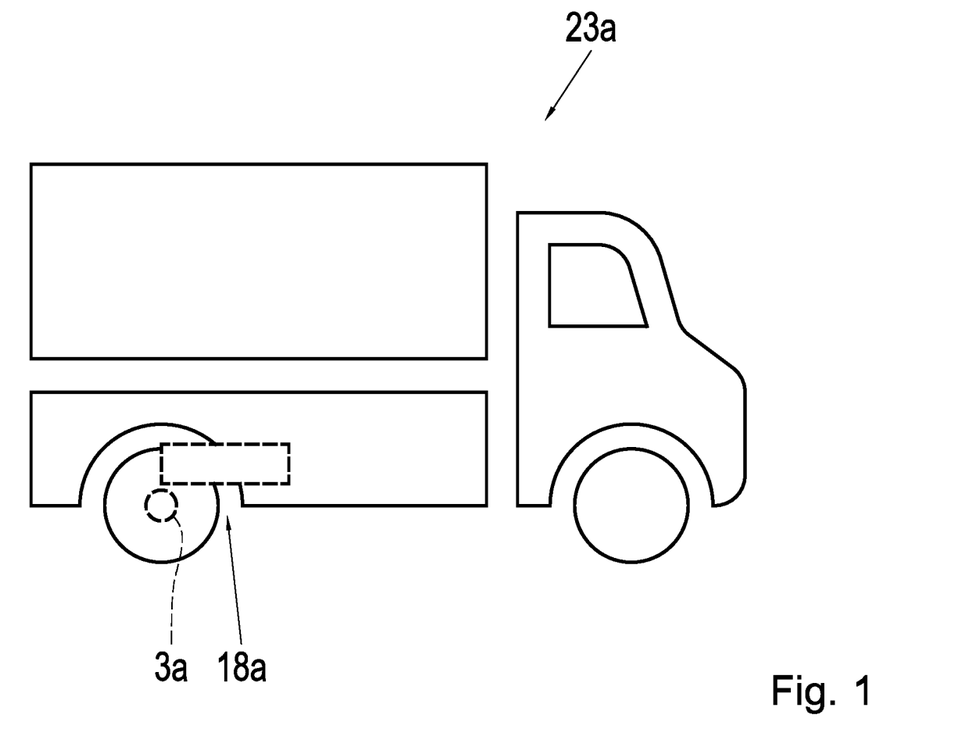
FIG. 1 is a schematic depiction of a vehicle.

FIG. 1 schematically shows a vehicle 23a, particularly a utility vehicle. The vehicle 23a is formed as a land vehicle, in this case, for example, as a truck. The vehicle 23a comprises a connection system 18a. The connection system 18a comprises a multipoint link 2a, particularly a four-point link, a vehicle axle 3a, particularly a multipart vehicle axle 3a, and a connection bridge device 1a (see FIG. 2).

Figure 2:
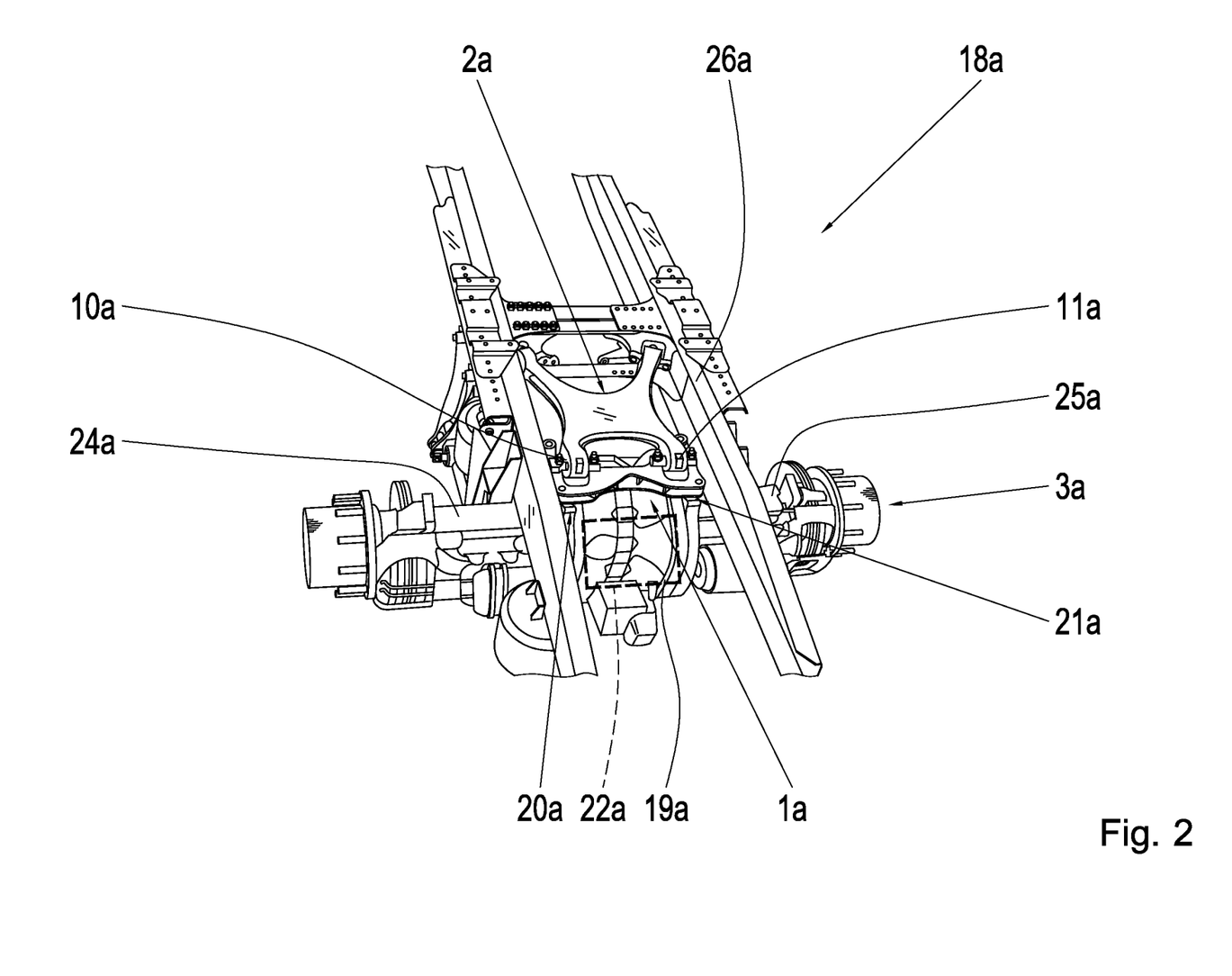
FIG. 2 is a schematic perspective diagram of a connection system of the vehicle from FIG. 1.

FIG. 2 shows the connection system 18a of the vehicle 23a from FIG. 1 in a schematic perspective view. The connection bridge device 1a is provided to connect the multipoint link 2a to the multipart vehicle axle 3a. In the present embodiment example, the multipoint link 2a is formed as a four-point link. The vehicle axle 3a has two connection units 20a, 21a for fastening the connection bridge device 1a which are arranged separate from a central portion 19a of the vehicle axle 3a. A connection unit 20a, 21a is arranged in each instance at a partial axle body 24a, 25a formed distinct from the central portion 19a. The partial axle bodies 24a, 25a which are formed distinct from the central portion 19a, in particular the connection units 20a, 21a, are arranged along the vehicle axle 3a symmetrically around the central portion 19a. The connection units 20a, 21a form screw locations for screwed fixing of the connection bridge device 1a to the partial axle bodies 24a, 25a formed distinct from the central portion.

The vehicle axle 3a is formed as a motorized axle. The central portion 19a comprises a drive unit 22a. The central portion 19a at least partially forms a drive housing for receiving the drive unit 22a. The drive unit 22a is arranged inside of the drive housing. The drive unit 22a comprises, for example, one or more electric motors, a differential and possibly a transmission step (not shown here). The central portion 19a is arranged centrally along the vehicle axle 3a between the two partial axle bodies 24a, 25a formed distinct from the central portion 19a and is coupled with the partial axle bodies 24a, 25a. The central portion 19a is less robust, particularly softer, than the partial axle bodies 24a, 25a formed distinct from the central portion 19a.

The multipoint link 2a is connected to a vehicle frame 26a of the vehicle 23a in an articulated manner at two points. The multipoint link 2a is coupled with the connection bridge device 1a in an articulated manner at two further points. The connection bridge device 1a is formed as a connection bridge, particularly as an axle bridge. The connection bridge device 1a is provided for connecting the multipoint link 2a indirectly to the vehicle axle 3a. The connection bridge device 1a serves as a connection piece between the multipoint link 2a and the vehicle axle 3a. The connection bridge device 1a is provided for at least partially receiving forces and/or torques transmitted between the vehicle axle 3a and the multipoint link 2a and at least partially dissipating these forces and/or torques from the central portion 19a, particularly into the partial axle bodies 24a, 25a which are formed distinct from the central portion 19a.

Figure 3:
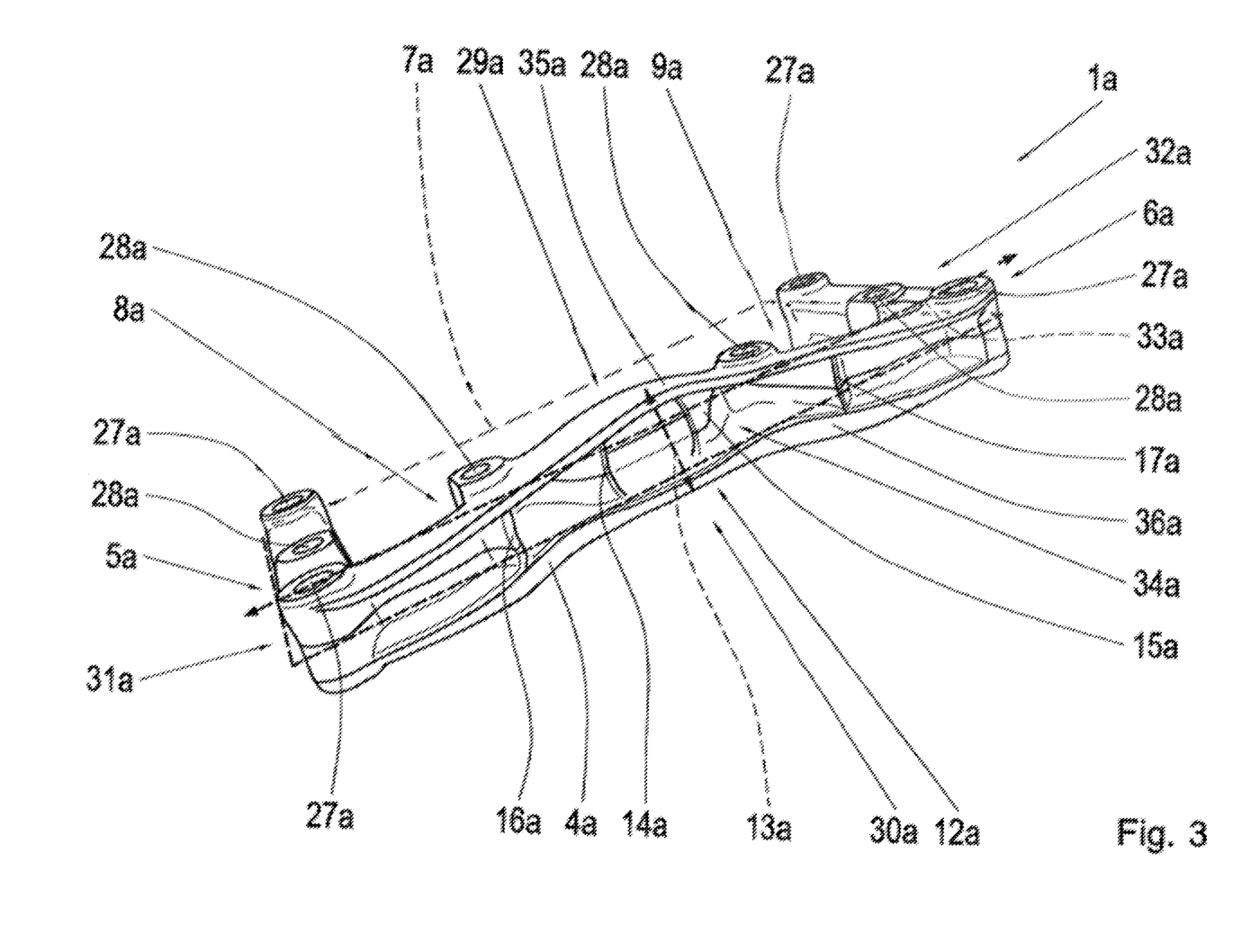
FIG. 3 is a schematic perspective diagram of a connection bridge device of the connection system from FIG. 2.

FIG. 3 shows the connection bridge device 1a of the connection system 18a from FIG. 2 in a schematic perspective view. The connection bridge device 1a comprises at least one base body 4a for receiving and dissipating forces and/or torques transmitted between the vehicle axle 3a and the multipoint link 2a. The connection bridge device 1a comprises two axle fastening units 5a, 6a for fastening the base body 4a to the vehicle axle 3a. The connection bridge device 1a comprises two link coupling units 8a, 9a for coupling the base body 4a to the multipoint link 2a, which are intersected by a main extension plane 7a of the base body 4a.

The axle fastening units 5a, 6a are provided for fastening the base body 4a to the two partial axle bodies 24a, 25a formed distinct from the central portion 19a, particularly to the connection units 20a, 21a. The base body is formed as a metal component part, particularly as a cast component part. The axle fastening units 5a, 6a and the link coupling units 8a, 9a are formed integral with the base body 4a. The connection bridge device 1a is formed as a one-piece component part. The axle fastening units 5a, 6a and the link coupling units 8a, 9a comprise fastening channels 27a, 28a for receiving fasteners. The fastening channels 27a, 28a extend through the base body 4a and, in particular, are defined by the base body 4a. The link coupling units 8a, 9a are at least partially arranged in the main extension plane 7a of the base body 4a, particularly for an efficient support of forces and/or torques through the base body 4a. The link coupling units 8a, 9a extend at least partially on two opposing sides 29a, 30a of the main extension plane 7a of the base body 4a.

The link coupling units 8a, 9a are provided for coupling the base body 4a with at least two coupling units 10a, 11a of the multipoint link 2a. The coupling units 10a, 11a of the multipoint link 2a are formed as connection claws, particularly as molecular joints (see FIG. 2). The link coupling units 8a, 9a are arranged in two outer areas 31a, 32a of the connection bridge device 1a, particularly one link coupling unit 8a, 9a for every outer area 31a, 32a. The outer areas 31a, 32a form extreme opposing points along a main extension direction 33a of the connection bridge device 1a. The axle fastening units 5a, 6a are arranged in the outer areas 31a, 32a, particularly one axle fastening unit 5a, 6a for each outer area 31a, 32a.

In a middle area 12a remote of the axle fastening units 5a, 6a, the base body 4a extends farther perpendicular to the main extension plane 7a than the link coupling units 8a, 9a. In the middle area 12a, the base body 4a extends farther perpendicular to the main extension plane 7a than the link coupling units 8a, 9a on both sides 29a, 30a of the main extension plane 7a. In the middle area 12a, the base body 4a has a maximum transverse extension 13a perpendicular to the main extension plane 7a. The base body 4a has a greater transverse extension 13a, particularly component thickness, perpendicular to the main extension plane 7a in the middle area 12a than in the outer areas 31a, 32a.

The base body 4a is at least partially formed as a hollow profile component. The base body 4a is formed as a hollow profile component that is open on one side. The base body 4a is formed at least partially open on a side 34a intersected by the main extension plane 7a. The base body 4a is formed at least partially open on a side 34a remote of the link coupling units 8a, 9a. The base body 4a is formed open in the middle area 12a.

The base body 4a has at least one stiffening rib 14a, 15a, 16a, 17a. In the present example, the base body 4a has, for example, four stiffening ribs 14a, 15a, 16a, 17a. The stiffening ribs 14a, 15a, 16a, 17a have planes of intersection with the main extension plane 7a. The stiffening ribs 14a, 15a, 16a, 17a extend perpendicular to and parallel to the main extension plane 7a. The stiffening ribs 14a, 15a, 16a, 17a support spaced-apart outer lateral surface areas 35a, 36a of the base body 4a against one another transverse to the main extension plane 7. The base body 4a with the stiffening ribs 14a, 15a, 16a, 17a is formed by a cast structure which is open on one side particularly in the middle area 12a. A first stiffening rib 14a and a second stiffening rib 15a are arranged symmetric to one another along the main extension direction 33a. A third stiffening rib 16a and a fourth stiffening rib 17a are arranged symmetric to one another along the main extension direction 33a.

The base body 4a has at least two stiffening ribs 14a, 15a, for example, the first stiffening rib 14a and the second stiffening rib 15a in the present example, which together form an undercut. The two stiffening ribs 14a, 15a at least partially define a central void in the middle area 12a. In the present example, the two stiffening ribs 14a, 15a form, for example, an angle of approximately 85° relative to one another considered in the main extension plane 7a. The third stiffening rib 16a and the fourth stiffening rib 17a extend parallel to one another considered in the main extension plane 7a.

Figure 4:
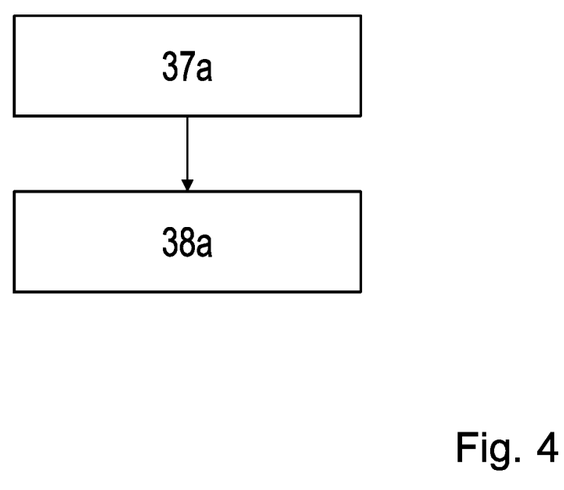
FIG. 4 is a flowchart of a process for producing a connection bridge device from FIG. 3, shown schematically.

FIG. 4 shows a schematic flowchart of a process for producing the connection bridge device 1a from FIG. 3. In at least one process step 37a, the connection bridge device 1a is cast. In at least a further process step 38a, at least one casting core is destroyed. In an alternative, the casting core may also be omitted in the casting process.

Figure 5:
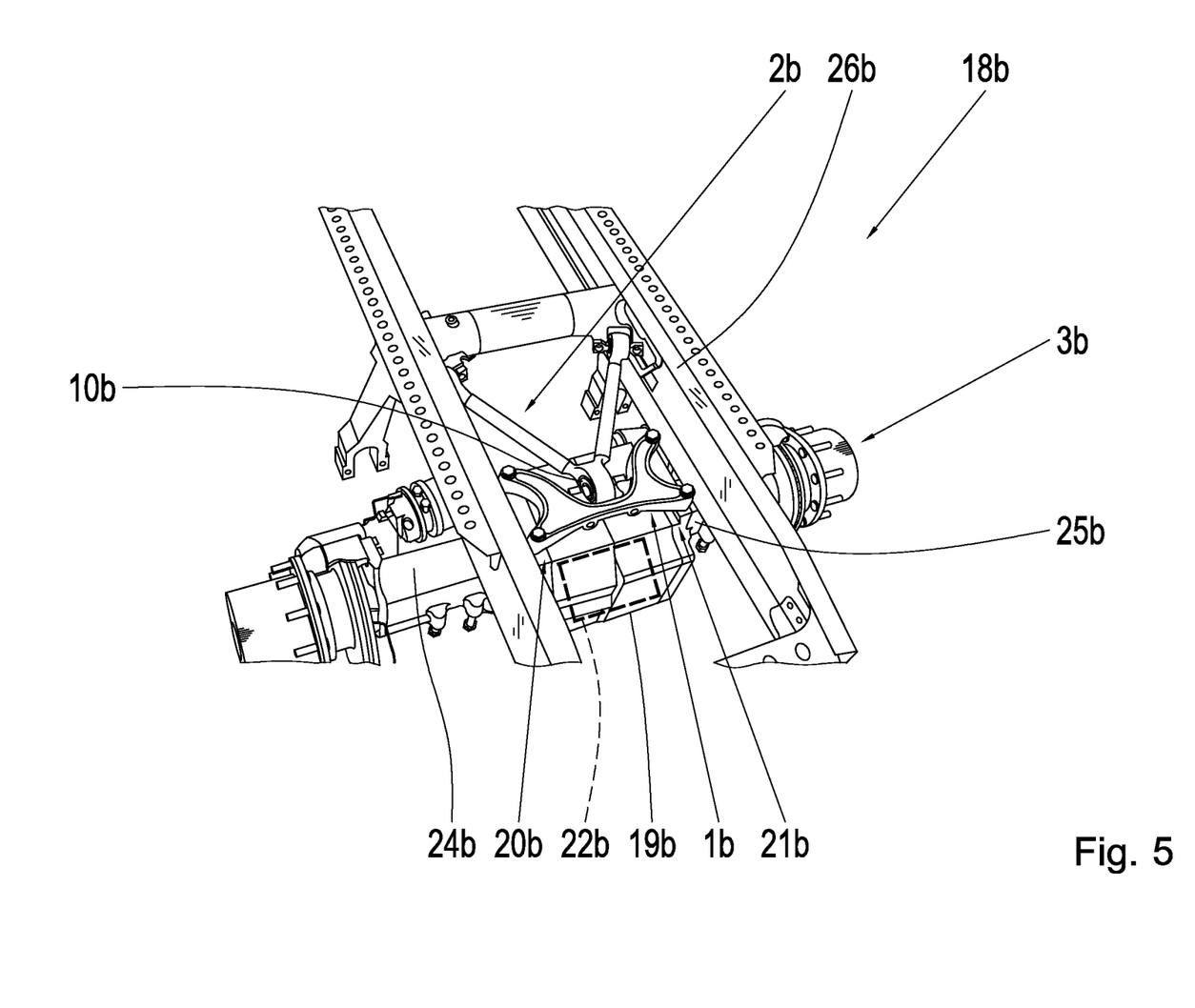
FIG. 5 a schematic perspective diagram of a connection system.
Figure 6:
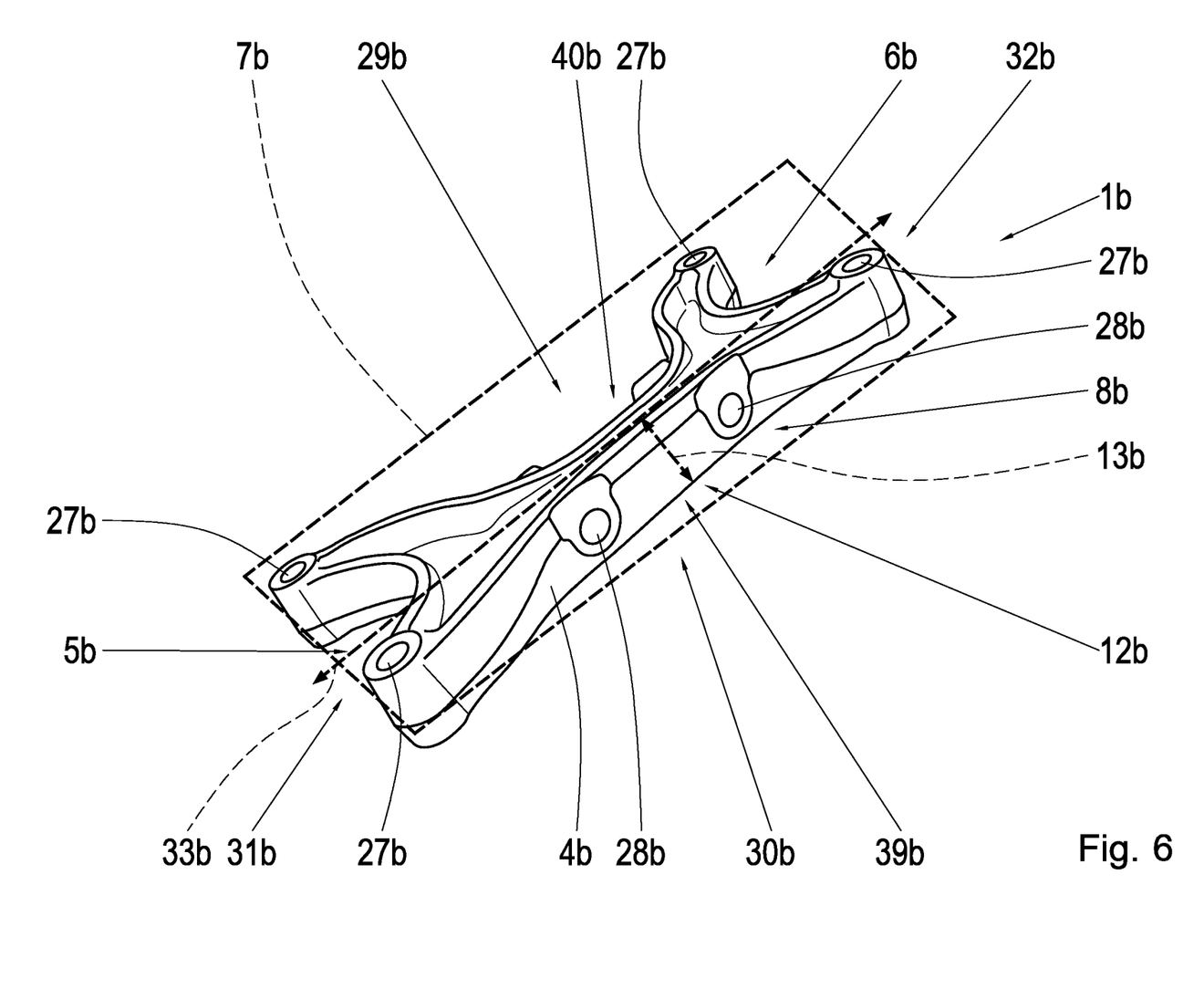
FIG. 6 is a schematic perspective diagram of a connection bridge device of the alternative connection system from FIG. 5.

A further example is shown in FIGS. 5 and 6. The example from FIGS. 1 to 4 may be referred to with regard to the construction of identically designated component parts, particularly with regard to component parts having identical reference numerals. In order to distinguish between the examples, the reference numerals of the example of FIGS. 1 to 4 are followed by the letter "a" and the reference numerals of the embodiment example of FIGS. 5 and 6 are followed by the letter "b".

FIG. 5 shows an alternative connection system 18b in a schematic perspective view. The connection system 18b comprises a multipoint link 2b, particularly a three-point link, a vehicle axle 3b, particularly comprising multiple parts, and a connection bridge device 1b. The vehicle axle 3b is substantially similar to the vehicle axle 3a shown in the preceding example. Multipoint link 2b is formed as a three-point link in contrast to the multipoint link 2a of the preceding example which is formed as a four-point link. The connection bridge device 1b is formed differently than the connection bridge device 1a of the preceding example in order to allow the three-point link to be connected to the vehicle axle 3b. The multipoint link 2b is connected to a vehicle frame 26b at two points in an articulated manner. The multipoint link 2b is coupled with the connection bridge device 1b at a further point in an articulated manner.

FIG. 6 shows the connection bridge device 1b of the alternative connection system 18b from FIG. 5 in a schematic perspective view. The connection bridge device 1b comprises a link coupling unit 8b for coupling a base body 4b of the connection bridge device 1b to the multipoint link 2b. Fastening channels 28b of the link coupling unit 8b are rotated by 90° relative to fastening channels 28a of the link coupling units 8a, 9a of the preceding embodiment example.

The base body 4b is formed at least partially as a hollow profile component part. The base body 4b is formed as a hollow profile component part which is open on multiple sides, particularly two sides. The base body 4b is formed open on two sides 39b, 40b which have no point of intersection with a main extension plane 7b of the base body 4b and which are arranged on different sides 29b, 30b of the main extension plane 7b.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A connection bridge device for connecting a multipoint link to a multipart vehicle axle, comprising:
   at least one base body for receiving and dissipating forces and/or torques transmitted between the multipart vehicle axle and the multipoint link;
   at least one axle fastening unit configured to fasten the at least one base body to the multipart vehicle axle; and
   at least one link coupling unit configured to couple the at least one base body to the multipoint link, wherein the at least one link coupling unit is intersected by a main extension plane of the at least one base body.

2. The connection bridge device according to claim 1, comprising at least two link coupling units configured to couple the at least one base body to at least two coupling units of the multipoint link.

3. The connection bridge device according to claim 2, wherein the at least one base body in a middle area remote of the at least one axle fastening unit extends perpendicular to the main extension plane farther than the at least two link coupling units.

4. The connection bridge device according to claim 1, wherein the at least one base body has a maximum transverse extension perpendicular to the main extension plane in a middle area remote of the at least one axle fastening unit.

5. The connection bridge device according to claim 1, wherein the at least one base body is formed at least partially as a hollow profile component.

6. The connection bridge device according to claim 5, wherein the at least one base body has at least one stiffening rib.

7. The connection bridge device according to claim 6, wherein the at least one base body has at least two stiffening ribs which together form an undercut.

8. A process for producing the connection bridge device according to claim 1, wherein the connection bridge device is cast.

9. A connection system comprising:
   at least one vehicle axle, configured as a multipart vehicle axle;
   at least one connection bridge device configured to connect a multipoint link to the multipart vehicle axle, comprising:
     at least one base body for receiving and dissipating forces and/or torques transmitted between the multipart vehicle axle and the multipoint link;
     at least one axle fastening unit configured to fasten the at least one base body to the multipart vehicle axle; and
     at least one link coupling unit configured to couple the at least one base body to the multipoint link, wherein the at least one link coupling unit is intersected by a main extension plane of the at least one base body,
   wherein the multipart vehicle axle has at least one connection unit arranged separate from a central portion of the multipart vehicle axle for fastening the at least one connection bridge device.

10. The connection system according to claim 9, wherein the multipart vehicle axle is a motorized axle, and the central portion comprises at least one drive unit.

11. The connection system according to claim 9, wherein at least one multipoint link, is configured as a three-point link or a four-point link.

12. A vehicle, comprising:
   at least one connection bridge device comprising:
     at least one base body for receiving and dissipating forces and/or torques transmitted between a vehicle axle and a multipoint link;
     at least one axle fastening unit configured to fasten the at least one base body to the vehicle axle; and
     at least one link coupling unit configured to couple the at least one base body to the multipoint link, wherein the at least one link coupling unit is intersected by a main extension plane of the at least one base body;
   or
     at least one vehicle axle, configured as a multipart vehicle axle; and
     the at least one connection bridge device,
     wherein the multipart vehicle axle has at least one connection unit arranged separate from a central portion of the multipart vehicle axle for fastening the at least one connection bridge device.

* * * * *